(No Model.)
H. S. BACON.
METAL BANDING IMPLEMENT.
No. 366,293. Patented July 12, 1887.
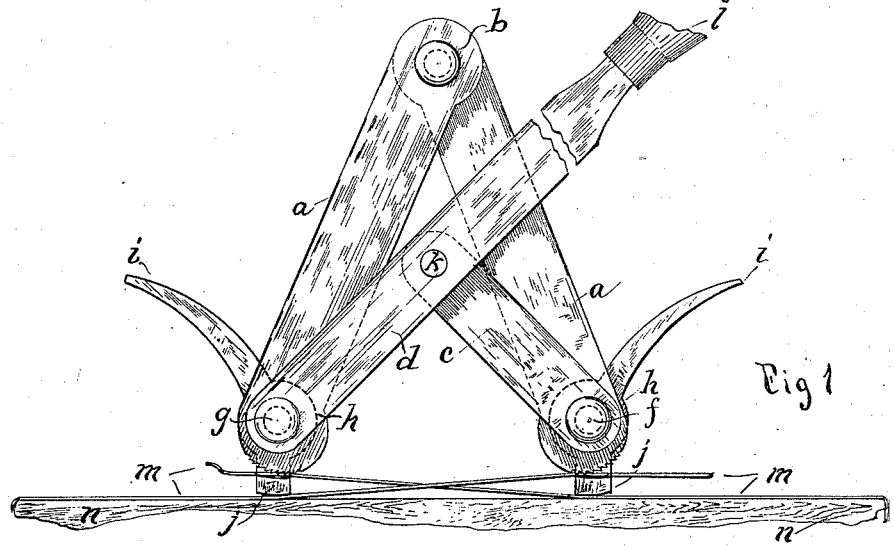
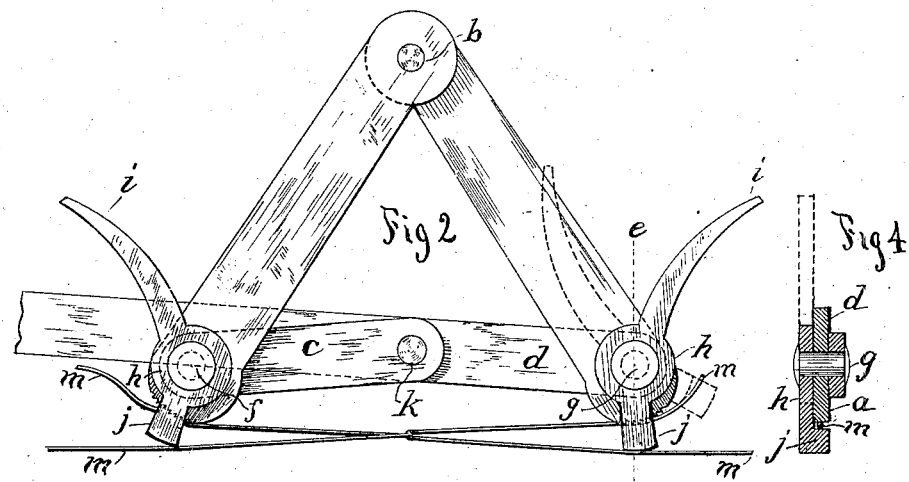
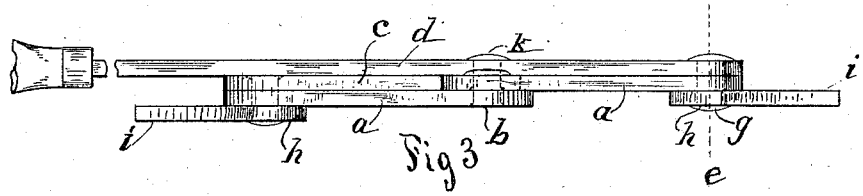
Witnesses
N. B. Bryant
Sidney Wetmore
Inventor
Henry S. Bacon
per T. W. Porter
Atty.

UNITED STATES PATENT OFFICE.

HENRY S. BACON, OF MILFORD, MASSACHUSETTS.

METAL BANDING IMPLEMENT.

SPECIFICATION forming part of Letters Patent No. 366,293, dated July 12, 1887.

Application filed October 8, 1886. Serial No. 215,664. (No model.)

*To all whom it may concern:*

Be it known that I, HENRY S. BACON, of Milford, in the county of Worcester and State of Massachusetts, have invented a new and useful Metal Banding Implement, which will, in connection with the accompanying drawings, be hereinafter fully described, and specifically defined in the appended claim.

This invention has for its object the production of an implement or tool of low cost, by means of which boxes and other packages may be metal-banded efficiently and with expedition; and the invention will, in connection with the accompanying drawings, be hereinafter fully described and specifically claimed.

In said drawings, Figure 1 is a side elevation of my machine shown in operative connection with the metallic band. Fig. 2 is an elevation the reverse of Fig. 1. Fig. 3 is a top plan view. Fig. 4 is a sectional view taken on line $e\ e$, Figs. 2 and 3, and viewed as from the right therein.

In said views, $a\ a$ represent two arms united by pivot $b$, and to the opposite or lower end of one of said arms the lever $d$ is united by pivot $g$, while link $c$ is at one of its ends secured to the lower end of the other of said arms by pivot $f$, and at its opposite end is pivoted to lever $d$ at $k$, said lever being provided with a suitable handle, $l$, (in part broken away.) The lower ends of arms $a$ are formed eccentric to pivots $f\ g$, and are toothed, as shown in Figs. 1, 2. Upon the pivots $f\ g$, respectively, are mounted the gripping-levers $h$, which are each formed with an actuating-handle, $i$, and a lip, $j$, which extends across the toothed end face of arms $a$, as shown in Fig. 4, the levers $h$ being so arranged that when arm $i$ is moved near to arms $a$ the lip $j$ will be farthest from the toothed end of arm $a$, as shown by dotted lines in Fig. 2. This allows the ready placing of wire $m$ between lip $j$ and arm $a$, when by moving lever $h$ to the position shown by solid lines in Figs. 1, 2 the wire is gripped firmly, as there shown.

In Fig. 1, $n$ represents (in part) a box as being banded by wire $m$, it being obvious that the raising of lever $d$ will close the toothed or lower ends of arms $a$ together, when, if the crossed ends of wire $m$ are respectively secured in the gripping devices, as shown, and lever $d$ be then depressed, the wire will be drawn with great binding force around the box, when by revolving the implement in a horizontal plane the wire will thereby be twisted together to secure the ends thereof from slipping, such twisting together being in part shown in Fig. 2.

If desired, arms $a$ may be extended equally from their uniting-pivot $b$ in both directions, in which case lever $d$ and link $c$ would be attached to the end opposite to the gripping-levers $h$; and said levers $h$ and arms $a$ may be formed to receive and grip a metal band having any desired configuration of cross-section, such as a thin band or other form.

By means of this implement wire or other metallic bands may at a material saving in cost be substituted for wooden hoops, while their efficiency as a binding security is much the greater.

I claim as my invention—

A banding implement having the pivoted arms $a\ a$, provided with band-gripping devices, substantially as shown, a lever, $d$, and link $c$, pivoted to each other and respectively to said arms, all combined substantially as specified.

HENRY S. BACON.

Witnesses:
T. W. PORTER,
F. O. BARNES.